United States Patent
Tandri et al.

(10) Patent No.: US 11,829,457 B1
(45) Date of Patent: Nov. 28, 2023

(54) SYSTEM AND METHOD FOR PREVENTING CODE EXFILTRATION

(71) Applicant: FMR LLC, Boston, MA (US)

(72) Inventors: Sudarsan Tandri, Cary, NC (US); Gregory Smith, Wake Forest, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/129,694

(22) Filed: Mar. 31, 2023

(51) Int. Cl.
*G06F 21/31* (2013.01)
*G06F 8/71* (2018.01)

(52) U.S. Cl.
CPC ............. *G06F 21/31* (2013.01); *G06F 8/71* (2013.01)

(58) Field of Classification Search
CPC .................................. G06F 21/31; G06F 8/71
USPC ............................................................ 726/4
See application file for complete search history.

(56) References Cited

U.S. PATENT DOCUMENTS

2008/0243898 A1* 10/2008 Gormish ............ G06F 21/64
   707/999.102
2020/0073657 A1* 3/2020 Robison ............ H04L 9/0637

* cited by examiner

*Primary Examiner* — Jacob Lipman
(74) *Attorney, Agent, or Firm* — Cesari and McKenna, LLP (57) ABSTRACT

A computer-implemented method for controlling access to a source code repository residing on a server system coupled to a communications network includes: receiving, by a computing device coupled to the network, an instruction to execute a client executable for accessing the source code repository, wherein the client executable includes a first hash based on the client executable; determining a validity of the first hash; computing a second hash based on the client executable; providing the first hash and the second hash to the server system; determining a validation result for the client executable, wherein the validation result is based on the first hash and the second hash matching a corresponding pair of hashes of a plurality of valid hashes stored in a database; in response to the validation result indicating that the client executable is valid, accessing the source code repository.

20 Claims, 5 Drawing Sheets

SYSTEM AND METHOD FOR PREVENTING CODE EXFILTRATION

BACKGROUND

Technical Field

The present invention relates to source code management, and more particularly to controlling access to a source code repository.

Background

Source code management refers to a class of systems responsible for managing changes to computer programs. One example of a source code management system is Git, a free and open-source distributed version control system available at git-scm.com. The Git system includes a Git server and a Git client. As Git's source code is freely available and can be modified easily, this creates a vulnerability that could lead to code exfiltration. The operator of a Git server may be able to control the server itself but may be unable to control the Git clients that access the server. Even a private and protected repository on a Git server may be accessed by a malicious client. The Git server only requires that the client uses one of four protocols: local file system, Hypertext Transfer Protocol (HTTP), Secure Shell (SSH), and the Git protocol, of which only HTTP and SSH allow user authentication. The documentation of these protocols is freely available. For example, documentation of four protocols can be accessed at git-scm.com/book/en/v2,Git-on-the-Server-The-Protocols. Therefore, a corrupt or malicious Git client executable is a potential vulnerability and may lead to confidential and/or protected code to be exfiltrated.

Secure code signing tools enable developers to append a digital signature to their binary code to ensure the integrity of the binary. However, there is no guarantee that an operating system that executes the binary enforces a validation procedure. Microsoft Windows, for example, only optionally enforces code integrity. Windows and other operating systems allow a user to run unsigned or corrupted binaries by simply turning off the enforcement rules. Other operating systems do not provide code validation at all. Therefore, a Git server cannot rely on code integrity enforcement by the client's operating system. A corrupted or malicious client that is allowed to execute even though its embedded signature is invalid can still access the Git server and exfiltrate code.

SUMMARY

The deficiencies of the prior art are overcome by providing a system and method to prevent code exfiltration. The methods and systems described herein ensure that only trusted, i.e. valid and approved, Git executables are allowed to access the source code repository. Since an operating system's enforcement of validation rules on the client side is optional, an added server-side validation ensures a greater level of security, scrutiny, and reduces the risk of code exfiltration.

In accordance with an embodiment of the present invention, a computer-implemented method for controlling access to a source code repository residing on a server system coupled to a communications network includes receiving, by a computing device coupled to the network, an instruction to execute a client executable for accessing the source code repository, wherein the client executable includes a first hash based on the client executable, The method includes determining, by the computing device, a validity of the first hash. The method also includes computing, by the computing device, a second hash based on the client executable. The method further includes providing, by the computing device over the network, the first hash and the second hash to the server system. The method includes determining, by the server system, a validation result for the client executable, wherein the validation result is based on the first hash and the second hash matching a corresponding pair of hashes of a plurality of valid hashes stored in a database. The method also includes, in response to the validation result indicating that the client executable is valid, accessing, by the computing device via the client executable, the source code repository.

Alternatively, or in addition, the source code repository is a Git repository. Also alternatively or in addition, the first hash is a signed hash, and the client executable further includes a public key corresponding to the signed hash. The second hash may be computed by the client executable.

Alternatively, or in addition, the computing device provides the first hash and the second hash to the server system via the client executable. The computing device, via the client executable, may provide the first hash and the second hash as part of a Hypertext Transfer Protocol request header.

Also, alternatively or in addition, the first hash has been computed based on less than the entirety of the client executable. The second hash may be computed based on the entirety of the client executable, including the first hash.

Further alternatively or in addition, the method further includes providing, by the computing device to the server system over the network, a username and a password; and in response to the validation resulting indicating that the client executable is valid, receiving, by the computing device from the server system over the network, an authentication result based on the username and password.

In accordance with another embodiment of the present invention, a system for controlling access to a source code repository includes a computing device coupled to a network and having a first processor coupled to a first memory. The first processor is configured to receive an instruction to execute a client executable for accessing the source code repository, wherein the client executable includes a first hash, the first hash based on the client executable. The first processor is also configured to compute a second hash of the client executable, the second hash based on the client executable. The first processor is configured to transmit the first hash and the second hash over the network. The system further includes a source code repository server system coupled to the network and including the source code repository, the source code repository server system having a second processor coupled to a second memory and to a database. The second processor is configured to receive the first hash and the second hash from the computing device. The second processor is also configured to retrieve a plurality of valid hashes from the database. The second processor is configured to determine a validity of the client executable based on the first hash and the second hash matching a corresponding pair of hashes of the plurality of valid hashes. The second processor is further configured to, in response to a determination that the client executable is valid, allow the client executable access to the source code repository. The second processor is also configured to, in response to a determination that the client executable is not valid, deny the client executable access to the source code repository.

Alternatively, or in addition, the source code repository is a Git repository. Also alternatively or in addition, the first hash is a signed hash, and the client executable further includes a public key corresponding to the signed hash.

Alternatively, or in addition, the first processor is configured to execute the client executable. The first processor may be caused to compute the second hash by the client executable. The first processor may also be caused to transmit the first hash and the second hash by the client executable. The first processor may be configured to transmit the first hash and the second hash as part of a Hypertext Transfer Protocol request header.

Also, alternatively or in addition, the first hash has been computed based on less than the entirety of the client executable. The first processor may be configured to compute the second hash based on the entirety of the client executable, including the first hash.

Further, alternatively or in addition, the second process is further configured to receive, over the network, a username and a password from the computing device; and in response to a determination that the client executable is valid, authenticate a user based on the username and password. The second processor may further be configured to transmit a result of the determination to a Git server.

In accordance with yet another embodiment of the present invention, a non-transitory computer-readable medium has software encoded thereon. The software, when executed by one or more processors, is operable to receive, by a computing device, an instruction to execute a client executable for accessing the source code repository, wherein the client executable includes a first hash, the first hash based on the client executable. The software is operable to determine, by the computing device, a validity of the first hash and to compute, by the computing device, a second hash of the client executable, the second hash based on the client executable. The software is operable to receive, by a source code repository server system including a source code repository, the first hash and the second hash from the computing device. The software further is operable to retrieve, by the source code repository server system, a plurality of valid hashes from a database. The software also is operable to determine, by the source code repository server system, a validity of the client executable based on the first hash and the second hash matching a corresponding pair of hashes of the plurality of valid hashes. The software is operable to, in response to a determination that the client executable is valid, allow the client executable access to the source code repository. The software is also operable to, in response to a determination that the client executable is not valid, deny the client executable access to the source code repository.

BRIEF DESCRIPTION OF THE DRAWINGS

The description below refers to the accompanying drawings, of which.

DETAILED DESCRIPTION OF ILLUSTRATIVE EMBODIMENTS

Figure 1:
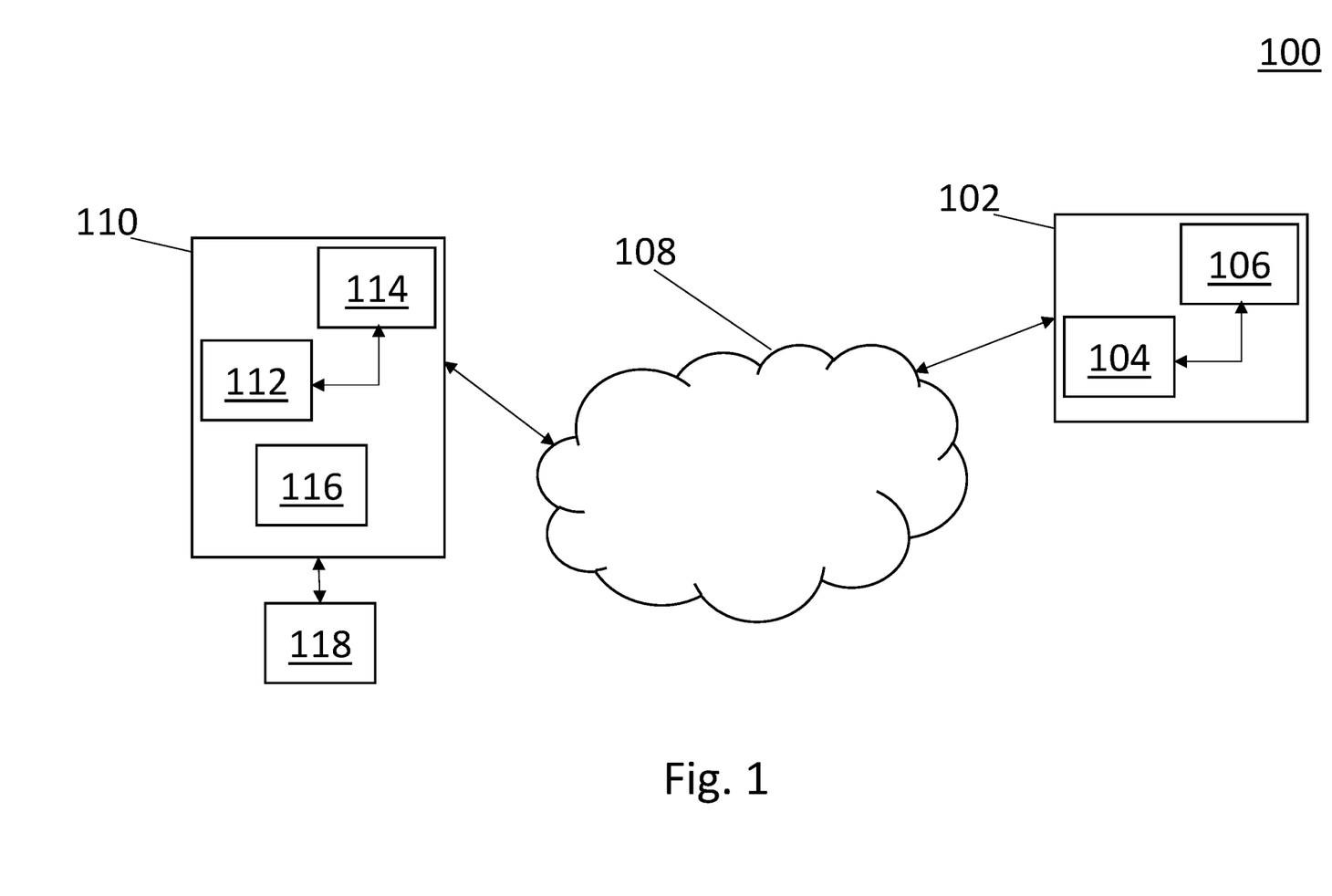
FIG. 1 is an illustration of a system for controlling access to a source code repository in accordance with an embodiment of the present invention.

FIG. 1 is an illustration of a system 100 for controlling access to a source code repository in accordance with an embodiment of the present invention. System 100 includes a computing device 102. The computing device 102 has a first processor 104 coupled to a first memory 106. The computing device 102 is also communicatively coupled to a communications network 108. Network 108 may be a public network, such as the internet, or it may be a private network, such as a network internal to a company. Network 108 also may be a combination of public and/or private networks. The computing device 102 may be coupled to the network 108 directly, for example via an Ethernet cable or via wireless connection such as Wi-Fi. Computing device 102 may also be coupled to the network 108 in any other way known to the skilled person, for example indirectly through another device (not shown), such, as, but not limited to, a router, a switch, a hub, a separate computer system, a mobile device, a modem, and/or a combination of these devices. The first processor 104 is configured to execute portions of the method described below in detail with reference to FIGS. 2 and 3.

Further coupled to the network 108 is a server system 110. The server system 110 includes a second processor 112 coupled to a second memory 114. Similar to the computing device 102, the server system 108 may be coupled to the network 108 directly or indirectly in any way known to the skilled person. The second processer 112 is configured to execute portions of the method described below in detail with reference to FIGS. 2 and 3. A source code repository 116 resides on the server system 110. The source code repository may be a Git repository or any other source code repository known to the skilled person. While the source code repository 116 resides on server system 110 and may be located on the same physical device as the second processor 112 and the second memory 114, it is also expressly contemplated that the source code repository 116 is located on a different physical device than the second processer 112 and/or the second memory 114. In this case, the device containing the second processor 112 and the second memory 114 and the device containing the source code repository 116 form the server system 110. The system 100 also includes a database 118. The database 118 may be communicatively coupled to server system 110 as shown, but it may also be a part of server system 110. The second processor 112 is configured to store data in the database 118 and to retrieve data from the database 118. While the database 118 is accessible to the server system 110 and the second processor 112, the computing device 102, including the first processor 104, does not have access to the database 118.

Figure 2:
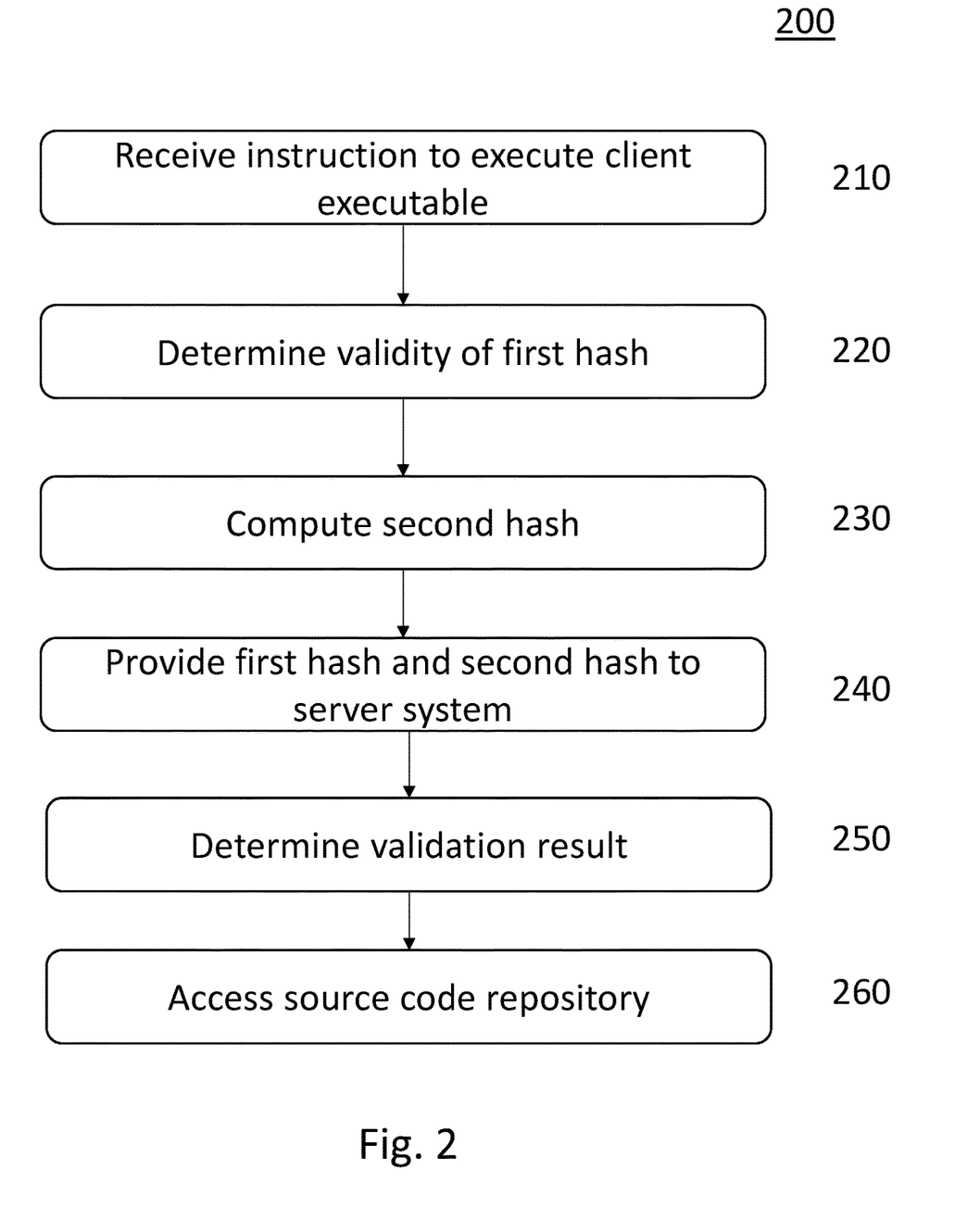
FIG. 2 is a flowchart of a method for controlling access to a source code repository in accordance with an embodiment of the present invention.

FIG. 2 is a flowchart of a computer-implemented method 200 for controlling access to a source code repository in accordance with an embodiment of the present invention. The computer-implemented method 200 may, for example, be executed by a processor of a computing device 102 as described above with reference to FIG. 1. Similar to what is described above, the computing device is coupled to a communications network 108. Also coupled to the communications network is a server system 110 on which a source code repository 116 resides.

In step 210, the computing device 102 receives an instruction to execute a client executable. This instruction may be received in any form known to the skilled person. Illustratively, the computing device 102 may receive the instruction from an operating system that it is running. A user of the computing device 102 may instruct the operating system to execute a client executable to access the source code repository 116. For example, the user may type the command "git" into a command line window to attempt to start a client executable named "git" that is then used to access the source code repository residing on a Git server. The client executable may be any client configured to access the source code repository 116. In the case of a Git server, the client executable is a Git client. Git includes client executables for the command line, but also includes client executables for committing code (git-gui) and browsing the source code repository (gitk). In addition, many third-party tools are available to users of a Git repository. A publicly available list of Git clients can be found at git-scm.com/downloads/guis. The client executable includes a first hash that is based on the executable itself. The first hash, and all other hashes described herein, may be computed using any hashing algorithm known to the skilled person, such as, but not limited to, MD5, SHA1, SHA256, or SHA512. This first hash is an embedded hash and may have been computed based on less than the entirety of the client executable. For example, the first hash may have been computed by excluding the hash itself, a digital signature, specific headers in the executable, and a public signing key. The first hash may have been computed according to code signing specifications from the manufacturer of the operating system of the computing device.

In step 220, the computing device 102 determines the validity of the first hash. Many operating systems provide code signing mechanisms to establish the authenticity of a client executable. The operating systems support validation of executables to validate that the executable has not been tampered with. The code signing process generates the first/embedded hash for the executable and embeds a signed version of the first hash and the public key used for signing in the executable. As stated above, this code signing mechanism may ignore certain parts of the client executable, such as the checksum, certificate table entries, and the digital certificate section, so that these parts do not affect the embedded hash. Omitting these parts ensures that the operating system can re-generate the hash based on the executable and compare it to the hash that is embedded in the executable, hereby validating the executable on the client side. If the embedded hash is signed, it may have been signed using a private/public key pair. The signing keys may have been generated by a certification authority, or they may have been generated by a user or administrator of the computing device and/or server system. The public key is embedded in the client executable so that the operating system can validate the key and the first hash.

In step 230, the computing device 102 computes a second hash based on the client executable. The second hash is a computed hash and may be computed by the client executable itself while it is executed by the computing device. The second hash is computed using the entirety of the client executable. In other words, the second hash takes into account not only the parts of the client executable that the first hash is based on, but also the first hash, the public key used to sign the first hash, if present, checksum, certificate tables, all headers, etc. Thus, the second hash includes the signature component of the client executable. Calculating the second hash based on the entirety of the client executable, including the first hash and the public key, ensures that no modifications to the client executable whatsoever may be made without the second hash changing.

In step 240, the computing device 102 provides the first hash and the second hash, i.e. the embedded hash and the computed hash, to the server system 110 over the network 108. Illustratively, for the case of a Git source code repository, Git supports standard Hypertext Transfer Protocol (HTTP) requests. While HTTP and Git are described herein, it is expressly noted that requests may also be made using HTTPS or secure shell (SSH), and/or that any other source code repository server may be used. In other words, the request may be made using any protocol that Git, or the respective source code repository residing on the server system 110, supports. The source code repository server, such as Git, must be aware of the additional attributes, such as the first hash and the second hash, that are provided to the server by the computing device.

Exemplarily, the client executable provides the first hash and the second hash to the source code repository server 116 residing on the server system 110 using HTTP request headers, i.e. as a key/value pair. The HTTP request may additionally include standard HTTP authentication when authentication is required to access a repository. Standard HTTP authentication includes a username and password that are provided to the server system by the client executable running on the computing device. If the Git server requires authentication by username and password, the Git server extracts this information from the HTTP request and uses it to authenticate a user of the computing device. To this end, the HTTP Authorization request header is used to provide credentials that authenticate a user agent, such as the client executable, with the server system. The credentials in the Authorization header for HTTP basic authentication are sent as follows:

Key: 'Authorization'
    Value: 'Basic', followed by a Base-64 encoding of the username and password in the format (username:password).

In addition to the authorization header, the client executable also provides an X-Correlation-ID header to the Git server. This header includes the first and second hashes of the client executable. The X-Correlation-ID header may be sent as follows:

Key: 'X-Correlation-ID'
    Value: a Base-64 encoding of the first hash and the second hash in the format (embeddedHash:computedHash).

The source code repository server system 110 then extracts the first hash and the second hash from the X-Correlation-ID header that it received.

In step 250, the server system 110 validates the first hash and the second hash and determines a validation result based on the two hashes. The details of the process to determine this validation result are described below with reference to FIG. 3.

In step 260, the client executable may access the source code repository 116 in response to a validation result that the client executable is valid. The client executable may access the source code repository 116 using the standard protocols defined for Git clients to access Git servers and known to the skilled person. As stated above, the Git server may require a username and password in addition to valid first and second hashes. In this case, the Git server authenticates a user of the computing device using the username and password before allowing access to the source code repository. If the first hash or second hash are invalid, or if the authentication based on username and password fails, the Git server may deny access to the source code repository to the client executable. Such denial may, for example, be indicated by a HTTP 403 (Forbidden) error that the server returns to the client.

Figure 3:
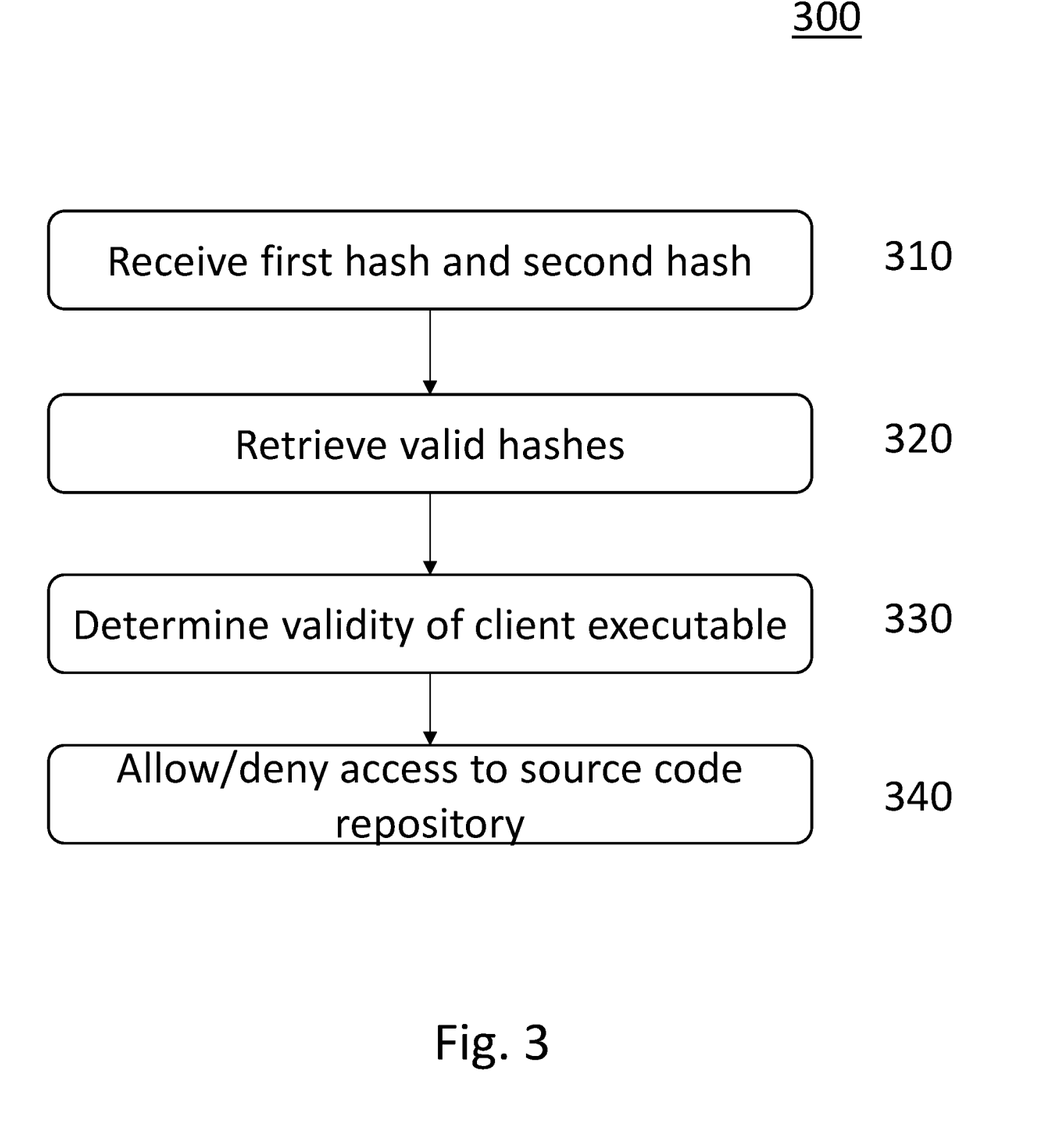
FIG. 3 is a flowchart of a method for controlling access to a source code repository in accordance with an embodiment of the present invention.

FIG. 3 is a flowchart of a method 300 for controlling access to a source code repository in accordance with an embodiment of the present invention. The method 300 may, for example, be executed by processor 112 of server system 110 and may be executed on demand as requested by the source code repository 116. The source code repository 116 may cause the server system 110 to execute the method, for example based on an application programming interface (API) call. The method may also be executed by the source code repository server itself that is running on the server system 110. The method 300 allows the server system 110 to validate the first and second hashes received from the computing device and to determine a validation result.

In step 310, the server system 110 receives the first and second hashes from the computing device 102 over the network 108 as described above. The server system may receive the first and second hashes directly from the computing device, or it may receive the first and second hashes indirectly, for example via the source code repository 116. In step 320, the server system 110 retrieves a plurality of valid hashes from database 118. The database 118 stores pairs of embedded and computed hashes of all client executables that have been allowed to access the source code repository 116. Each allowed client executable has a unique pair of an embedded hash and a corresponding computed hash, and these pairs are stored in the database 118.

In step 330, the server system 110 determines the validity of the client executable. To this end, the server system 110 compares the received first hash and the received second hash to the plurality of pairs of embedded and computed hashes in the database. If the received first and second hashes exactly match a pair of an embedded hash and a corresponding computed hash in the database, the server system 110 determines that the client executable is valid. If the received first and second hashes do not match any pair of corresponding embedded and computed hashes in the database, the server system 110 determines that the client executable is invalid.

In step 340, the server system 110 acts on the validation result determined in step 330 and either allows or denies the client executable access to the source code repository 116. If the validation result indicates that the client executable is valid, the server system 110 allows the client executable access. As described above, such access may occur using standard Git protocols. If the validation result indicates that the client executable is invalid, the server system 110 denies the client executable access to the source code repository 116. As stated above, the server system 110 may for example return an HTTP 403 error to the client executable. Also as described above, the source code repository server may require further authentication in addition to client executable validation, for example user authentication via a username and password, before granting access to the source code repository.

Figure 4:
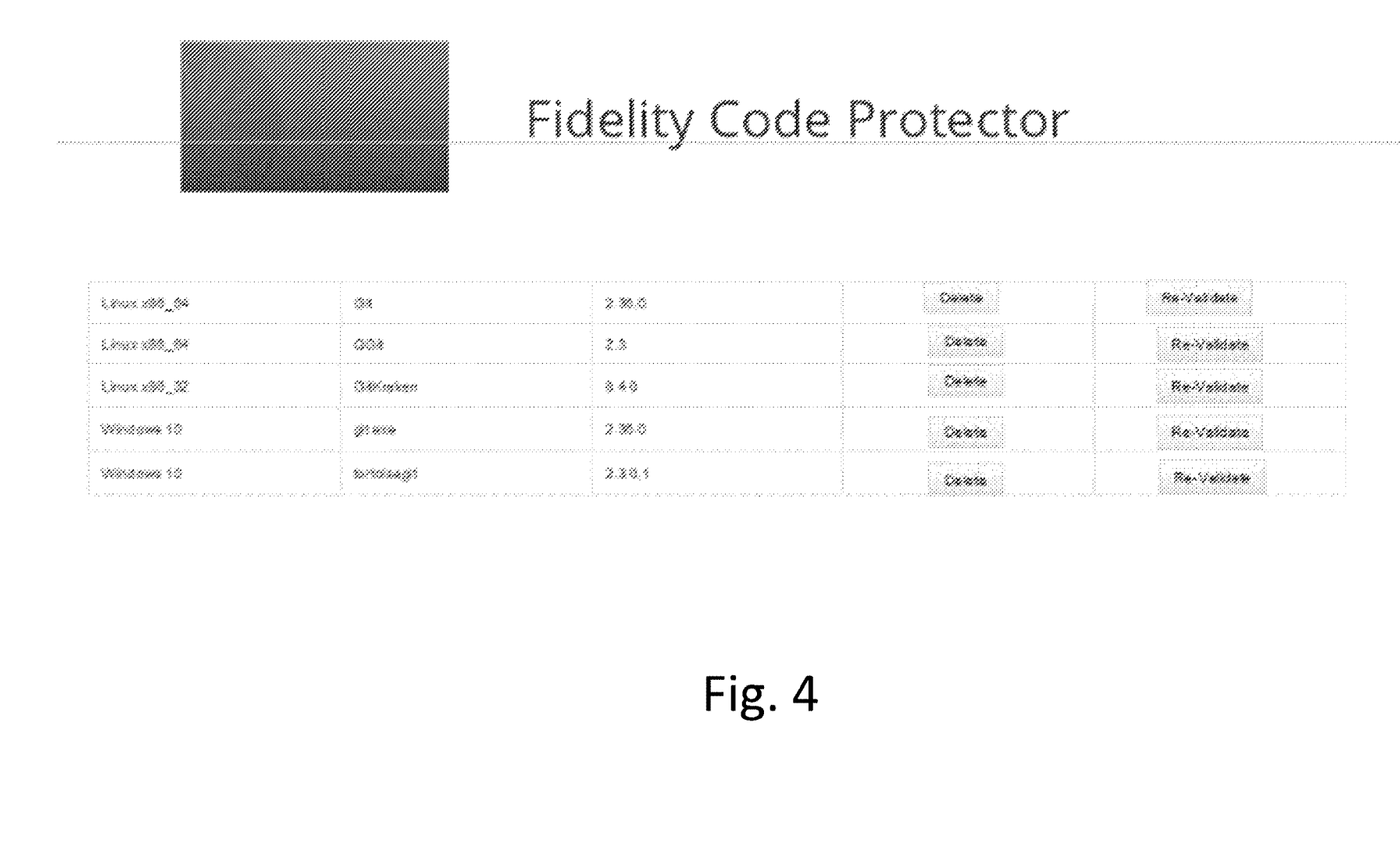
FIG. 4 is an illustration of a user interface for managing valid executables.

FIG. 4 is illustration of a user interface for managing valid executables. This exemplary user interface is generated by the server system 110 and allows the administration of the contents of the database 118. The user interface may, for example, be generated by a web server running on the server system 110 and having access to the database 118. Illustratively, the administration interface provides three functions: uploading a valid client executable, maintenance of valid client executables, and downloading valid client executables.

An administrator of the server system 110 may wish to upload a valid client executable to the server system to add its information to the database 118. To this end, the user interface allows the administrator to upload the desired executable. Once the executable is uploaded, the server system computes the embedded hash. The server system may additionally sign the binary executable using a private/public key pair. As described above, certain components of the executable are ignored for computing the embedded hash. The server system also computes the computed hash. As described above, the computed hash is calculated over the entirety of the uploaded client executable. The server system 110 then adds this pair of embedded hash and corresponding computed hash to the database 118. The server system may also store additional information in the database 118, for example the name of the client executable, an operating system under which the client executable can be executed, and a version of the client executable. The server system may further store information about the hashing algorithms used to compute the embedded and computed hashes in the database. In some embodiments, the server system may also store the client executable itself, either in the database 118 or in the server's file system. After the information about the uploaded client executable has been added to the database, that client executable is now deemed valid to access the source code repository and will be granted access.

The user interface also allows the administrator to manage the valid executables after they have been uploaded. As can be seen in FIG. 4, the server system may provide the administrator with a list of all valid client executables whose embedded and computed hashes and additional information are stored in the database 118. The user interface may allow the administrator to delete the information about a specific client executable from that database. After the information has been deleted, that client executable is no longer deemed valid to access the source code repository and will be denied access. The user interface may also allow the administrator to re-validate a specific client executable. To re-validate an executable, the administrator uploads it again, and the server system recomputes the embedded and computed hashes. This is useful in situations where the binary version of an executable has changed, but the accompanying information such as name, version number, etc. has not.

Figure 5:
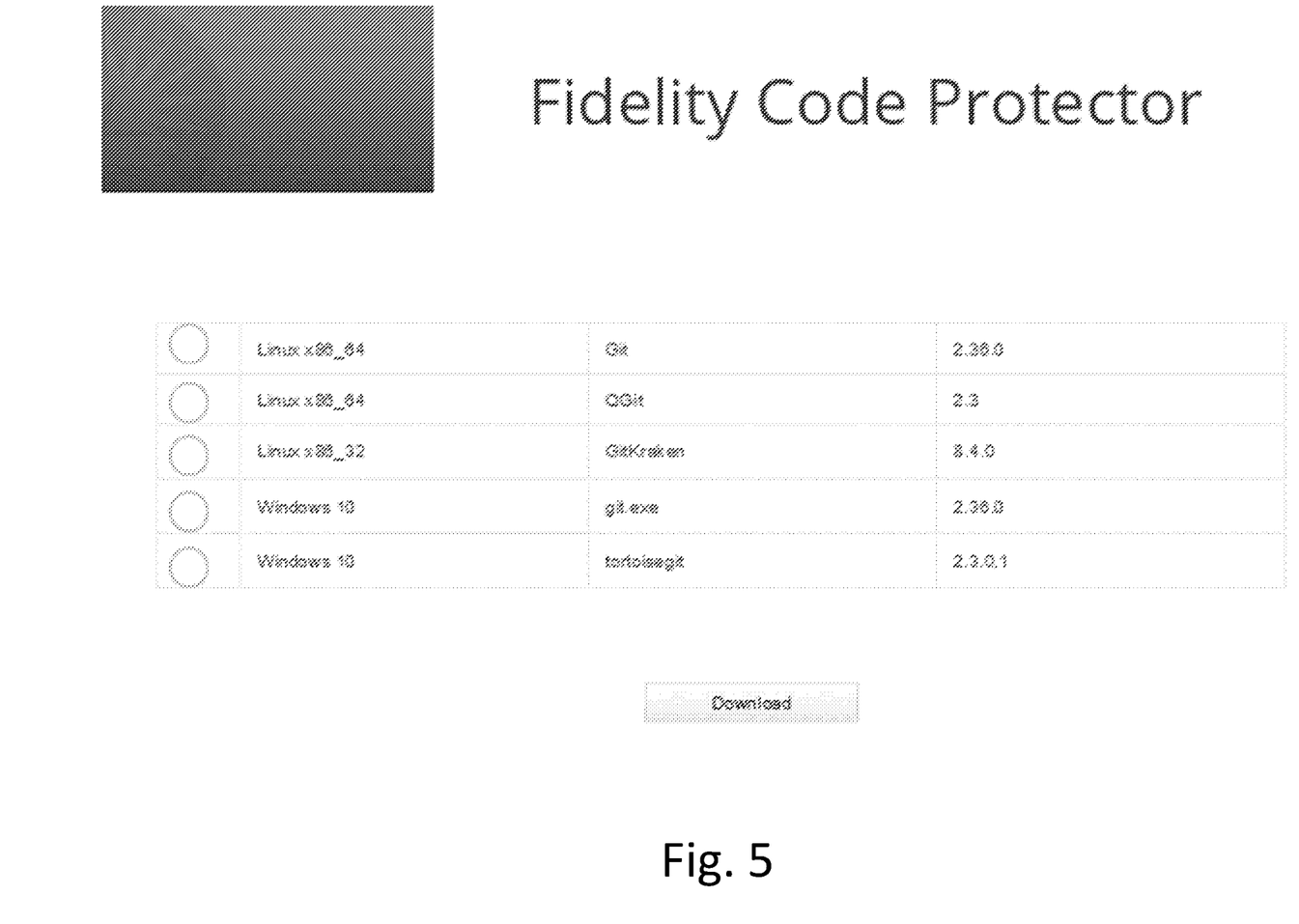
FIG. 5 is an illustration of a user interface for downloading valid executables.

FIG. 5 is an illustration of a user interface for downloading valid executables. This exemplary user interface is generated by the server system 110, for example by a web server, and allows a user to download a valid client executable. Before a user can access the source code repository, he/she needs to download a valid client executable that is allowed to access the repository. The exemplary list shown in FIG. 5 includes various options for client executables for different operating systems. A user may select one of the clients and then press the download button to obtain the selected client executable. If the server system 110 stores the client executable in the database 118 or in its file system, the server system may transmit the client executable to the user's computer after the user clicked download. Alternatively, the server system may provide the user's computer with a download link to obtain the desired client executable from a different server.

Embodiments of the present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

The foregoing description described certain example embodiments. It will be apparent, however, that other variations and modifications may be made to the described embodiments, with the attainment of some or all of their advantages. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. A computer-implemented method for controlling access to a source code repository residing on a server system coupled to a communications network, the method comprising:
   receiving, by a computing device coupled to the network, an instruction to execute a client executable for accessing the source code repository, wherein the client executable includes a first hash based on the client executable;
   determining, by the computing device, a validity of the first hash;
   computing, by the computing device, a second hash based on the client executable;
   providing, by the computing device over the network, the first hash and the second hash to the server system;
   determining, by the server system, a validation result for the client executable, wherein the validation result is based on the first hash and the second hash matching a corresponding pair of hashes of a plurality of valid hashes stored in a database; and
   is in response to the validation result indicating that the client executable is valid, accessing, by the computing device via the client executable, the source code repository.

2. The computer-implemented method of claim 1, wherein the source code repository is a Git repository.

3. The computer-implemented method of claim 1, wherein the first hash is a signed hash and wherein the client executable further includes a public key corresponding to the signed hash.

4. The computer-implemented method of claim 1, wherein the second hash is computed by the client executable.

5. The computer-implemented method of claim 1, wherein the computing device provides the first hash and the second hash to the server system via the client executable.

6. The computer-implemented method of claim 5, wherein the computing device via the client executable provides the first hash and the second hash as part of a Hypertext Transfer Protocol request header.

7. The computer-implemented method of claim 1, wherein the first hash has been computed based on less than the entirety of the client executable.

8. The computer-implemented method of claim 1, wherein the second hash is computed based on the entirety of the client executable, including the first hash.

9. The computer-implemented method of claim 1, further comprising providing, by the computing device to the server system over the network, a username and a password; and in response to the validation resulting indicating that the client executable is valid, receiving, by the computing device from the server system over the network, an authentication result based on the username and password.

10. A system for controlling access to a source code repository, the system comprising:
    a computing device coupled to a network and having a first processor coupled to a first memory, the first processor configured to:
        receive an instruction to execute a client executable for accessing the source code repository, wherein the client executable includes a first hash, the first hash based on the client executable;
        compute a second hash of the client executable, the second hash based on the client executable;
        transmit the first hash and the second hash over the network;
    a source code repository server system coupled to the network and including the source code repository, the source code repository server system having a second processor coupled to a second memory and to a database, the second processor configured to:
        receive the first hash and the second hash from the computing device;

retrieve a plurality of valid hashes from the database;

determine a validity of the client executable based on the first hash and the second hash matching a corresponding pair of hashes of the plurality of valid hashes;

in response to a determination that the client executable is valid, allow the client executable access to the source code repository; and in response to a determination that the client executable is not valid, deny the client executable access to the source code repository.

11. The system of claim 10, wherein the source code repository is a Git repository.

12. The system of claim 10, wherein the first hash is a signed hash and wherein the client executable further includes a public key corresponding to the signed hash.

13. The system of claim 10, wherein the first processor is further configured to execute the client executable and is caused to compute the second hash by the client executable.

14. The system of claim 10, wherein the first processor is configured to transmit the first hash and the second hash as part of a Hypertext Transfer Protocol request header.

15. The system of claim 10, wherein the first processor is further configured to execute the client executable and is caused to transmit the first hash and the second hash by the client executable.

16. The system of claim 10, wherein the first hash has been computed based on less than the entirety of the client.

17. The system of claim 10, wherein the first processor is configured to compute the second hash based on the entirety of the client executable, including the first hash.

18. The system of claim 10, wherein the second processor is further configured to receive, over the network, a username and a password from the computing device and, in response to a determination that the client executable is valid, authenticate a user based on the username and password.

19. The system of claim 10, wherein the second processor is further configured to transmit a result of the determination to a Git server.

20. A non-transitory computer-readable medium having software encoded thereon, the software, when executed by one or more processors operable to:

receive, by a computing device, an instruction to execute a client executable for accessing the source code repository, wherein the client executable includes a first hash, the first hash based on the client executable;

determine, by the computing device, a validity of the first hash;

compute, by the computing device, a second hash of the client executable, the second hash based on the client executable;

receive, by a source code repository server system including a source code repository, the first hash and the second hash from the computing device;

retrieve, by the source code repository server system, a plurality of valid hashes from a database;

determine, by the source code repository server system, a validity of the client executable based on the first hash and the second hash matching a corresponding pair of hashes of the plurality of valid hashes;

in response to a determination that the client executable is valid, allow the client executable access to the source code repository; and in response to a determination that the client executable is not valid, deny the client executable access to the source code repository.

* * * * *